United States Patent [19]

Robinson

[11] Patent Number: 4,539,120
[45] Date of Patent: Sep. 3, 1985

[54] METHODS OF FLOCCULATING SOLIDS-BEARING AQUEOUS SUSPENSIONS

[75] Inventor: C. Douglas Robinson, St. Charles, Ill.

[73] Assignee: U.S. Environmental Products, Inc., St. Charles, Ill.

[21] Appl. No.: 615,953

[22] Filed: May 31, 1984

Related U.S. Application Data

[62] Division of Ser. No. 399,759, Jul. 19, 1982, abandoned.

[51] Int. Cl.³ ............................................. B01D 21/01
[52] U.S. Cl. ................................. 210/738; 210/199; 210/205; 261/DIG. 75; 366/101; 366/167
[58] Field of Search ............... 210/702, 738, 198.1, 210/205, 206, 199; 261/DIG. 75; 366/10, 101, 104, 107, 134, 167, 171, 340, 341

[56] References Cited

U.S. PATENT DOCUMENTS

| | | | |
|---|---|---|---|
| 1,380,851 | 6/1921 | Tobler | 422/225 |
| 2,111,788 | 3/1938 | Krchma | 210/738 |
| 2,692,764 | 10/1954 | Hanson | 366/167 |
| 2,717,772 | 9/1955 | Palivos | 210/198.1 |
| 3,232,590 | 2/1966 | Eckert | 366/336 |
| 3,666,663 | 5/1972 | Walker | 210/738 |
| 3,697,305 | 1/1967 | Walden | 366/101 |
| 3,704,006 | 11/1972 | Grout et al. | 422/257 |
| 4,201,867 | 5/1980 | Gasper | 210/738 |

FOREIGN PATENT DOCUMENTS

| | | | |
|---|---|---|---|
| 205072 | 6/1956 | Canada | 366/167 |
| 1165618 | 3/1964 | Fed. Rep. of Germany | 261/76 |
| 52-68064 | 6/1977 | Japan | 210/738 |
| 1039702 | 8/1966 | United Kingdom | 261/DIG. 75 |
| 2035816 | 6/1980 | United Kingdom | 210/738 |
| 607988 | 5/1978 | U.S.S.R. | 366/10 |

Primary Examiner—Peter Hruskoci
Attorney, Agent, or Firm—Allegretti, Newitt, Witcoff & McAndrews, Ltd.

[57] ABSTRACT

An injection and mixing device for the introduction of flocculant into aqueous material, such as sewage or sludge, prior to dewatering is disclosed. The device includes an angled housing and injection means for introducing the flocculant into the housing countercurrent to the incoming flow of aqueous material. The combination of the turbulence caused by the angled housing and the countercurrent injection evenly and rapidly disperses the flocculant within the aqueous material regardless of the material's solids content. A downstream sparger ring is also disclosed for use with high solids content material.

2 Claims, 3 Drawing Figures

METHODS OF FLOCCULATING SOLIDS-BEARING AQUEOUS SUSPENSIONS

The present application is a division of copending application Serial No. 399,759, filed on July 19, 1982 now abandoned.

BACKGROUND OF THE INVENTION

1. Field of the Invention

The present invention relates to flocculant injection and mixing apparatus for use in dewatering sewage, industrial waste, sludge, and other contaminated aqueous material. When mixed with the aqueous material, the flocculant aids the separation of the contaminating solids from the aqueous medium.

2. Background of the Invention

Prior to dewatering sludge, sewage, or industrial waste, it must be mixed with a flocculant that causes the solid waste matter to aggregate into floccules. These floccules settle to the bottom of the container allowing the water to be easily removed by filtering or decanting.

Long chain polymers are frequently used as flocculators for conditioning and dewatering sludge. To achieve the highest degree of flocculation, however, the polymer must be dispersed within the aqueous material as evenly and rapidly as possible. A uniform distribution of polymer insures that the maximum amount of solid material is flocculated with the minimum amount of polymer. Furthermore, the polymer must be rapidly mixed with the aqueous material because most polymeric flocculators have an extremely short reaction time.

Three basic types of flocculant injection and mixing systems are presently used in the treatment of sludge and sewage. The first type employs a web-like sparger ring located within the conduit carrying the aqueous material. The sparger ring's webbing has channels that face upstream and the flocculant is injected into the sewage through these channels. Mixing of the flocculant and aqueous material takes place due to the currents and eddies caused by the aqueous material flowing passed the webbing of the sparger ring.

This first type of injection and mixing system, however, is ineffective when the flow carrying conduit is of a relatively small diameter, because the currents and eddies caused in such pipes are insufficient to uniformly mix the flocculant and the aqueous material. Furthermore, if the aqueous material has a high solids content (i.e., greater than 2%), the webbing of the sparger ring tends to trap the solid matter and clog the conduit. The dewatering system must then be shut down, at great cost, until the conduit can be cleared.

The second type of known polymer injection system introduces the flocculator through a series of holes on the periphery of the flow carrying conduit. The flocculant and the aqueous material are mixed as the aqueous material passes a series of static devices that are located downstream from the injection holes. Examples of such static devices are baffles mounted on the inside of the pipe and pipe fittings designed to abruptly change the direction of flow.

This second type of mixing system is generally less effective in dispersing the flocculant than the first type. Complete dispersion of the flocculant depends upon the fluid traversing the series of static devices. Since the traverse time is usually greater than the brief reaction time of polymeric flocculants, the polymer is largely inactive by the time it is mixed with the waste material. Also, aqueous materials having a high solids content do not create liquid shear forces around the static devices that are sufficient to evenly disperse the flocculant. Additionally, the baffles used in some of these injection and mixing systems can cause clogging of the flow carrying conduit.

The third type of known system injects flocculant into the flow carrying conduit as a constant stream. The necessary mixing is then performed by mechanical devices, such as propellers or turbine mixers, mounted either within the conduit or within a separate tank.

This third system is the least effective of the three because the dispersion of the flocculant depends entirely upon the liquid shear forces generated by the propeller or turbine means. Thus, regardless of the shape of the fluid container, polymeric flocculant cannot be equally dispersed throughout the entire container within the brief reaction time of the polymer. Furthermore, this third type of system requires a high energy input in order to produce enough liquid shear forces to cause any mixing.

Therefore, there is a need for a flocculant injection and mixing apparatus that is capable of evenly and rapidly dispersing flocculant within aqueous material of high or low solids content prior to dewatering. Furthermore, there is a need for an injection and mixing apparatus that is small and compact in size, economical to manufacture, easy to maintain and operate, and energy efficient. In addition, there is a need for a flocculant injection apparatus that will not clog the flow carrying conduit in the presence of aqueous material having a high solids content.

SUMMARY OF THE INVENTION

It is an object of the present invention to provide a flocculant injection and mixing apparatus for the introduction of flocculant into aqueous material such as contaminated water, sewage, sludge, or industrial waste, prior to dewatering the aqueous material, which apparatus is capable of evenly and rapidly dispersing the flocculant within the aqueous material, regardless of the aqueous material's solids content.

It is a further object of the present invention to provide a flocculant injection and mixing device that is compact, economical to make, easy to maintain, and energy efficient.

It is an additional object of the present invention to provide a flocculant injection and mixing device that will not clog the flow carrying conduit in the presence of aqueous material with a high solids content.

It is a specific object of the present invention to provide a flocculant injection mixing apparatus for the introduction of polymer flocculant into aqueous material prior to dewatering the aqueous material, which apparatus includes a housing that is attached to and in communication with the flow carrying conduit. The housing includes at least two orifices that comprise an inlet and an outlet for the aqueous material. The inlet and the outlet are connected by the housing at an angle such that turbulence is created in the aqueous material as it flows through the housing. The inventive apparatus also includes injection means extending into the housing for the introduction of the flocculant substantially countercurrent to the flow of the aqueous material into the housing. Thus, the flocculant is injected against the flow of the aqueous material precisely at the point where turbulence in the aqueous material is caused by the abrupt change in the direction of the flow from the inlet to the outlet. The simultaneous combination of countercurrent injection and turbulence evenly and rapidly mixes the flocculant with the aqueous material such that maximum flocculation occurs during the extremely brief reaction time of polymer flocculants. Furthermore, a minimum amount of flocculant is necessary to achieve complete flocculation of the aqueous material, thus lowering the cost of dewatering.

For some aqueous materials with high solids content, the turbulence provided by the angled housing may not be sufficient to effect complete mixing of the flocculant. In such cases, mixing means may be attached to the flow carrying conduit downstream from the housing for introducing gas or liquid into the conduit to further mix the flocculant and the aqueous material. The mixing means preferably comprise a sparger ring with an interior diameter equal to the interior diameter of the flow carrying conduit so that the ring will not clog the pipe due to large solids in the aqueous material. The sparger ring is preferably located immediately downstream from the injection means so that the further mixing takes place shortly after the flocculant is introduced. Thus, the present invention can thoroughly and quickly disperse a flocculant within an aqueous material regardless of its solids content.

The present invention is relatively small in size and is economical to manufacture. Also, because the present invention requires no moving parts, no complicated maintenance is necessary. Furthermore, the present invention is economical to operate because the injection means require a minimal input of energy as compared with the known injector systems. The optional sparger ring uses only small gas or liquid volumes and pressures to provide complete mixing.

Further objects and embodiments of the present invention will become evident from the following description of the preferred embodiments and claims.

DESCRIPTION OF THE PREFERRED EMBODIMENTS

Figure 1:
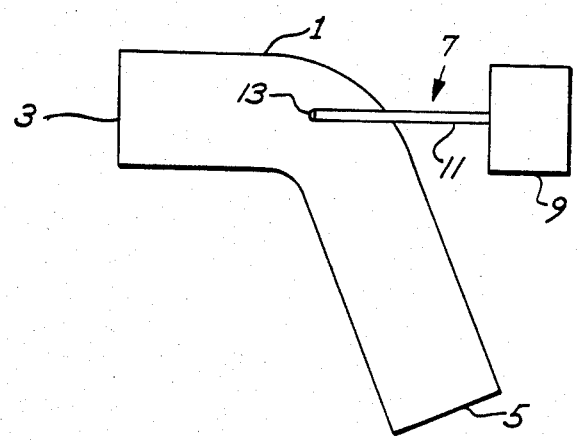
FIG. 1 is a sectional plan view of an embodiment of the present invention.

Referring to FIG. 1, one embodiment of the present invention comprises a housing 1 having two orifices 3 and 5. Orifice 3 forms an inlet for the aqueous material while orifice 5 forms an outlet. The housing 1 connects the inlet 3 and outlet 5 such that the inlet 3 and outlet 5 are oriented at an angle sufficient to cause turbulence in the aqueous material flowing through the housing 1.

The present invention also includes injection means 7 that preferably comprise a pump 9 that pumps the flocculant into an injection tube 11. The injection tube 11 extends into the housing 1 and has at least one spray nozzle 13 attached to it for spraying the flocculant into the aqueous material substantially against the flow of the aqueous material into the housing 1. The injection means of the present invention may also include an atomizer (not shown) in place of the spray nozzle that mixes a gas with the flocculant before it is injected into the housing.

Figure 2:
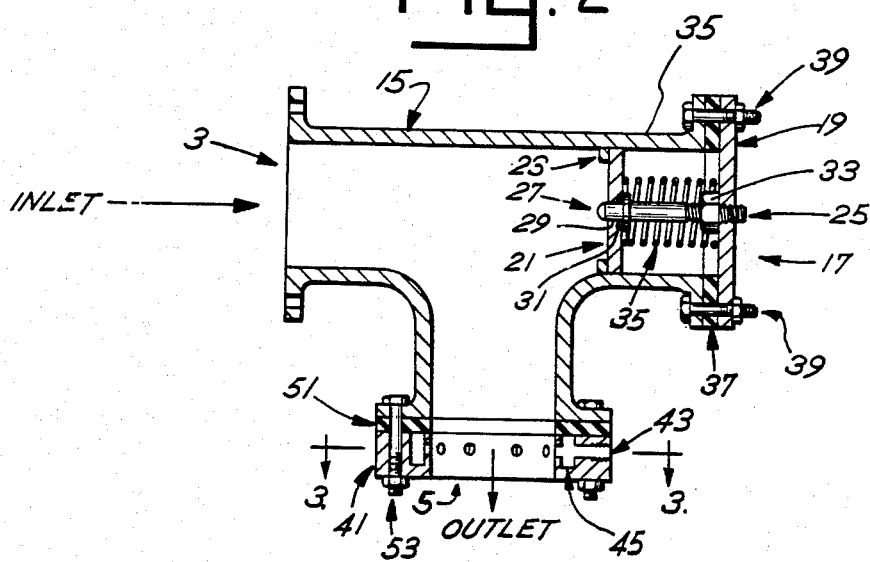
FIG. 2 is a sectional plan view showing the preferred embodiment of the present invention having a sparger ring.

Referring to FIG. 2, the preferred embodiment of the present invention comprises a tee pipe fitting 15 having three orifices 3, 5, and 17. The orifice 17 serves as a polymer injection orifice and has a blind flange 19 attached to it. The orifice 3 forms the inlet for the aqueous material and the orifice 5 forms the outlet.

In the polymer injection orifice 17, a plate 21 that is shaped to fit the inside of the pipe fitting 15 is placed against a retaining ring 23. The retaining ring 23 is held against the inside pipe surface by any appropriate method, such as welding, gluing, or the use of retaining screws. The plate 21 is fastened rigidly to the retaining ring 23.

An injection tube 25 having a spray nozzle 27 is placed through the blind flange 19 and the plate 21 such that the spray nozzle 27 projects through the plate 21. A hole 29 in the plate 21 is provided such that a minimum portion of the spray nozzle 27 projects through the plate 21. The spray nozzle 27, therefore, will not obstruct large solids passing through the pipe fitting 15. An O ring 31 is used to seal the surfaces of the plate 21 and nozzle 27.

The end of the injection tube 25 that extends through the blind flange 19 is threaded and a nut 33 is placed on the injection tube 25 inside of the blind flange 19. A spring 35 is placed over the injection tube 25 to maintain pressure on the O ring 31 to keep the aqueous material from flooding behind the plate 21. The blind flange 19 is bolted to the tee pipe fitting 15 with a gasket 37 and bolts 39.

As the aqueous material enters the inlet orifice 3 of the apparatus, flocculant is pumped through the injection tube 25 to the spray nozzle 27 by means of a standard pump (not shown). The flocculant is then sprayed against the flow of the aqueous material. The spray pattern produced by the spray nozzle 27 can be full cone, hollow cone, fan or any other shape found to be effective for a particular aqueous material. Dispersion of the flocculant within the aqueous material occurs very rapidly. The retaining ring 23 and the plate 21 form a wall against the incoming aqueous material that causes the direction of flow to abruptly change. This bend in the pipe fitting creates additional turbulence in the aqueous material and flocculant mixture and, therefore, evenly mixes the flocculant and the aqueous material.

Figure 3:
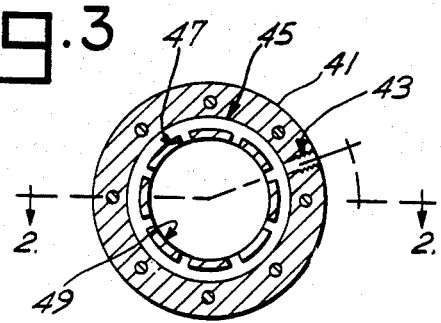
FIG. 3 is a front view of the preferred embodiment of the sparger ring.

In some aqueous material with a high solids content (i.e., greater than 2%), the turbulence and mixing effects created by the tee pipe fitting and injection tube may not be sufficient for proper mixing. In such cases a sparger ring is provided for the pressurized introduction of air, water, or some other gas or fluid into the flow carrying conduit after the flocculant has been injected into the aqueous material. Referring to FIGS. 2 and 3, the sparger ring 41 is attached to the outlet orifice 5 and has an inside diameter equal to the inside diameter of the outlet orifice 5. The sparger ring 41 includes an injection port 43 that connects the external gas or fluid source (not shown) to a transport channel 45. Injection passages 47 connect the transport channel 45 to the interior 49 of the sparger ring 41. The sparger ring 41 is attached to the outlet orifice 5 by means of a gasket 51 and standard bolts 53.

The components of the present invention can be made from any material that is suitable to the type and pressure of the aqueous material passing through it. The apparatus of the present invention can be attached to the flow carrying conduit by means of any acceptable type of joint, for example, socket welded, threaded, or welded. Furthermore, a plurality of spray nozzles can be used instead of the single spray nozzle 27 shown in FIG 1. A plurality of spray nozzles may be desirable under certain circumstances to insure even distribution of the flocculant. Also, the sparger ring 41 may be replaced by one or a series of holes in the periphery of the pipe fitting 1 that are attached to an external gas or fluid supply.

Although the present invention was developed to inject flocculant into sludge or sewage prior to dewatering, it has application far beyond this narrow range. The present invention may be used wherever one aqueous material is to be mixed with another aqueous material flowing through a conduit.

It is to be understood that the above described embodiments of the invention are merely illustrative of the applications and principles of this invention and that numerous other arrangements and modifications may be made within the spirit and scope of this invention.

I hereby claim as my invention:

1. A method of introducing a flocculant into a solids-bearing aqueous suspension flowing through a substantially unobstructed conduit, said flocculant causing said solids to aggregate into floccules, comprising the following steps:
   (a) injecting the flocculant into a substantially unobstructed, angled flow passage zone substantially countercurrent to the flow of the aqueous suspension into the zone, the zone being defined by a housing attached to and in communication with the substantially unobstructed conduit, the housing comprising a pipe fitting having three orifices, the first orifice forming an inlet for the aqueous suspension, the second orifice forming an outlet for the aqueous suspension, the third orifice having a blind flange attached thereto through which the flocculant is injected into the pipe fitting by means of a pump, an injection tube and at least one spray nozzle, the pipe fitting connecting the inlet, the outlet, and the third orifice such that the inlet and the outlet are oriented at substantially a right angle with respect to each other and the inlet and the third orifice are oriented in a substantially colinear fashion with respect to each other; and
   (b) introducing gas or liquid into the substantially unobstructed conduit by means of a sparger ring downstream from the zone to further mix the aqueous suspension and flocculant, the sparger ring being attached to the outlet such that the sparger ring is in communication with the conduit, the diameter of the interior of the sparger ring being substantially equal to the interior diameter of the conduit.

2. In a sludge dewatering system, an apparatus for introducing a flocculant into a solids-bearing aqueous suspension, said flocculant causing said solids to aggregate into floccules, comprising in combination,
   (a) a substantially unobstructed upstream conduit through which the aqueous suspension flows;
   (b) a substantially unobstructed downstream conduit through which the flocculant and the aqueous suspension flow;
   (c) a housing comprising a pipe fitting having three orifices, the first orifice forming an inlet for the aqueous suspension, the second orifice forming an outlet for the aqueous suspension, the third orifice having a blind flange attached thereto, the pipe fitting connecting the inlet, the outlet, and the third orifice such that the inlet and the outlet are oriented at substantially a right angle with respect to each other and the inlet and the third orifice are oriented in a substantially colinear fashion with respect to each other, the housing thereby defining a substantially unobstructed, angled flow passage zone for the aqueous suspension;
   (d) injection means for introducing the flocculant through the blind flange into the aqueous suspension flowing through the zone substantially countercurrent to the flow of the aqueous suspension into the zone, the injection means comprising a pump, an injection tube and at least one spray nozzle; and
   (e) a sparger ring for introducing gas or liquid into the conduit downstream from the zone to further mix the aqueous suspension and the flocculant, the sparger ring being attached to the outlet such that the sparger ring is in communication with the conduit, the diameter of the interior of the sparger ring being substantially equal to the interior diameter of the conduit.

* * * * *